United States Patent [19]
Hill et al.

[11] Patent Number: 6,161,198
[45] Date of Patent: *Dec. 12, 2000

[54] SYSTEM FOR PROVIDING TRANSACTION INDIVISIBILITY IN A TRANSACTION PROCESSING SYSTEM UPON RECOVERY FROM A HOST PROCESSOR FAILURE BY MONITORING SOURCE MESSAGE SEQUENCING

[75] Inventors: Michael James Hill, Vadnais Heights; Thomas Pearson Cooper, New Brighton; Dennis Richard Konrad, Welch; Thomas L. Nowatzki, Shoreview, all of Minn.

[73] Assignee: Unisys Corporation, Blue Bell, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/997,322

[22] Filed: Dec. 23, 1997

[51] Int. Cl.[7] ...................................................... H02H 3/05
[52] U.S. Cl. .................................. 714/15; 714/4; 714/11; 710/19; 710/20; 710/52; 710/54; 710/55; 709/237; 707/202
[58] Field of Search .............................. 711/152; 707/8, 707/202; 714/11, 4, 15; 705/8; 379/266, 265; 709/237, 208, 202; 710/19, 20, 52, 54, 55

[56] References Cited

U.S. PATENT DOCUMENTS

| | | | |
|---|---|---|---|
| 4,725,834 | 2/1988 | Chang et al. | 340/825.5 |
| 4,933,969 | 6/1990 | Marshall et al. | 713/177 |
| 5,084,816 | 1/1992 | Beese et al. | 714/4 |
| 5,193,162 | 3/1993 | Bordsen et al. | 711/152 |
| 5,247,380 | 9/1993 | Lee et al. | 359/118 |
| 5,282,238 | 1/1994 | Berland | 455/557 |
| 5,307,481 | 4/1994 | Shimazaki et al. | 714/11 |
| 5,333,314 | 7/1994 | Masai et al. | 707/202 |
| 5,384,565 | 1/1995 | Cannon | 340/825.44 |
| 5,434,775 | 7/1995 | Sims | 705/8 |
| 5,450,577 | 9/1995 | Lai et al. | 714/15 |
| 5,465,328 | 11/1995 | Dievendorff et al. | 714/15 |
| 5,701,427 | 12/1997 | Lathrop | 709/237 |
| 5,717,919 | 2/1998 | Kodavalla et al. | 707/8 |
| 5,737,399 | 4/1998 | Witzman | 379/112 |
| 5,781,912 | 7/1998 | Demers et al. | 707/202 |
| 5,793,861 | 8/1998 | Haigh | 257/693 |
| 5,838,913 | 11/1998 | Lysejko et al. | 709/208 |
| 5,937,343 | 8/1999 | Leung | 455/403 |
| 6,085,200 | 7/2000 | Hill et al. | 707/202 |

FOREIGN PATENT DOCUMENTS 408125679  5/1996  Japan.

OTHER PUBLICATIONS

Byers, L.L. et al., U.S. Patent Application, Attorney Docket No. RA–3264, filed Dec. 23, 1993, entitled "Extended Processing Complex for File Caching".

Cooper, T.P. et al., U.S. Patent Application, Attorney Docket No. RA–3247, filed Dec. 23, 1993, entitled "Outboard File Cache System".

*Primary Examiner*—Meng-Ai T. An
*Assistant Examiner*—Nabil El-Hady
*Attorney, Agent, or Firm*—Charles A. Johnson; Mark T. Starr; Altera Law Group

[57] ABSTRACT

A system and method for providing transaction indivisibility in a transaction processing system through the use of commonly-accessible modules for monitoring and maintaining proper source message sequencing is provided. A source message is transmitted from the host processing unit upon recovery of a failure of the host processing unit, where the source message includes information destined for the database, and an identifying sequence number. The identifying sequence number is compared to a stored sequence number, where the stored sequence number is associated with an immediately preceding source message received prior to the failure of the host processing unit. A source message indivisibility failure is indicated where the identifying sequence number is not consecutive with respect to the stored sequence number, while the source message is added to a message execution queue if the identifying sequence number is consecutive with respect to the stored sequence number.

29 Claims, 8 Drawing Sheets

SYSTEM FOR PROVIDING TRANSACTION INDIVISIBILITY IN A TRANSACTION PROCESSING SYSTEM UPON RECOVERY FROM A HOST PROCESSOR FAILURE BY MONITORING SOURCE MESSAGE SEQUENCING

FIELD OF THE INVENTION

This invention relates generally to computer input/output (I/O) systems, and more particularly to a system and method for providing transaction indivisibility in a transaction processing system through the use of commonly-accessible modules for monitoring and maintaining proper source message sequencing.

BACKGROUND OF THE INVENTION

Many computing systems today utilize multiple processing units, resulting in a computer architecture generally referred to as multiprocessing. Multiprocessing systems are often used for transaction processing, such as airline and banking systems. Transaction processing refers generally to a technique for organizing multi-user, high volume, on-line applications that provides control over user access and updates of databases. A transaction refers to the execution of a retrieval or an update program in a database management system. Transactions originating from different users may be aimed at the same database records. This situation, if not carefully monitored, may cause the database to become "inconsistent". Where all transactions are executed one after the other, the database will remain in a consistent state.

To maintain transaction indivisibility, either all database updates in a transaction processing system or none of the updates are applied to the database. In prior art systems, database management systems have retained a copy of the existing data whenever the transaction requests a database update. If the transaction proceeds to a stable point, all new updates are secured to the database by the database management system. If the transaction does not proceed to a stable point because a failure occurs before the updates are secured to the database, none of the updates are applied. The prior art systems typically use control messaging between various components in the transaction processing system to ensure that each database transaction request is processed once and only once. If this complex synchronization between these various components is not maintained, the data in the database can become inconsistent. However, the synchronization between these components is very complex, and causes undesirable system overhead inefficiencies.

Therefore, it is desirable to provide a system for providing transaction indivisibility without the complex synchronization between various system components. The present invention provides a solution to this problem by providing a centralized system accessible by all components, where an indivisibility analysis can be performed for all source messaging, regardless of which terminal or associated host processor initiated the transaction. The present invention therefore provides a solution to the aforementioned and other problems, and offers other advantages over the prior art.

SUMMARY OF THE INVENTION

The present invention relates to a system and method for providing transaction indivisibility in a transaction processing system through the use of commonly-accessible modules for monitoring and maintaining proper source message sequencing.

In accordance with one embodiment of the invention, a method for providing transaction indivisibility in a transaction processing system having at least one host processing unit and a database is provided. A source message is transmitted from the host processing unit upon recovery of a failure of the host processing unit, where the source message includes information destined for the database, and includes an identifying sequence number. The identifying sequence number is compared to a stored sequence number, where the stored sequence number is associated with an immediately preceding source message received prior to the failure of the host processing unit. A source message indivisibility failure is indicated where the identifying sequence number is not consecutive with respect to the stored sequence number, while the source message is added to a message execution queue if the identifying sequence number is consecutive with respect to the stored sequence number.

In accordance with another embodiment of the invention, a method for providing database transaction indivisibility in a transaction processing system following recovery from a host processor failure is provided, where the host processor transmitted at least one source message prior to the failure of the host processor. A unique sequence number is transmitted with each of the source messages transmitted prior to the failure of the host processor. Each of the unique sequence numbers are incrementally sequential in accordance with a source message transmission sequence. The unique sequence number corresponding to the most-recently transmitted source message that was successfully entered on a message execution queue is stored. A post-recovery source message, which is a re-transmission of the source message which was transmitted during the host processor failure, is transmitted along with its unique sequence number upon recovery from the host processor failure. The post-recovery source message is entered on the message execution queue when the unique sequence number of the post-recovery source message is incrementally sequential with respect to the stored unique sequence number. Post-recovery source messages are disregarded when the unique sequence number of the post-recovery source message is equivalent to the stored unique sequence number, which indicates that the post-recovery source message was successfully entered on the message execution queue prior to the host processor failure.

In accordance with another aspect of the invention, a task management system for ensuring database transaction indivisibility in a transaction processing system having a plurality of host processing units and a database is provided. A message queue having a plurality of storage segments is used to queue source messages destined for the database sent by each of the host processing units. A plurality of producer descriptors, one for each of the plurality of host processing units in the transaction processing system, are each coupled to its respective one of the host processing units to receive unique sequence numbers corresponding to each of the source messages sent by its respective one of the host processing units. The producer descriptors include a sequence number storage register to store a first sequence number uniquely identifying a first source message, and receiving register to receive a subsequent second source message and a second sequence number uniquely identifying the second source message. The producer descriptors also include a message sequence comparator coupled to the sequence number storage register and the receiving register to compare the first and second sequence numbers. A transfer of the second source message to the message queue is enabled when the first and second sequence numbers indicate that the second source message immediately succeeds the first source message.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
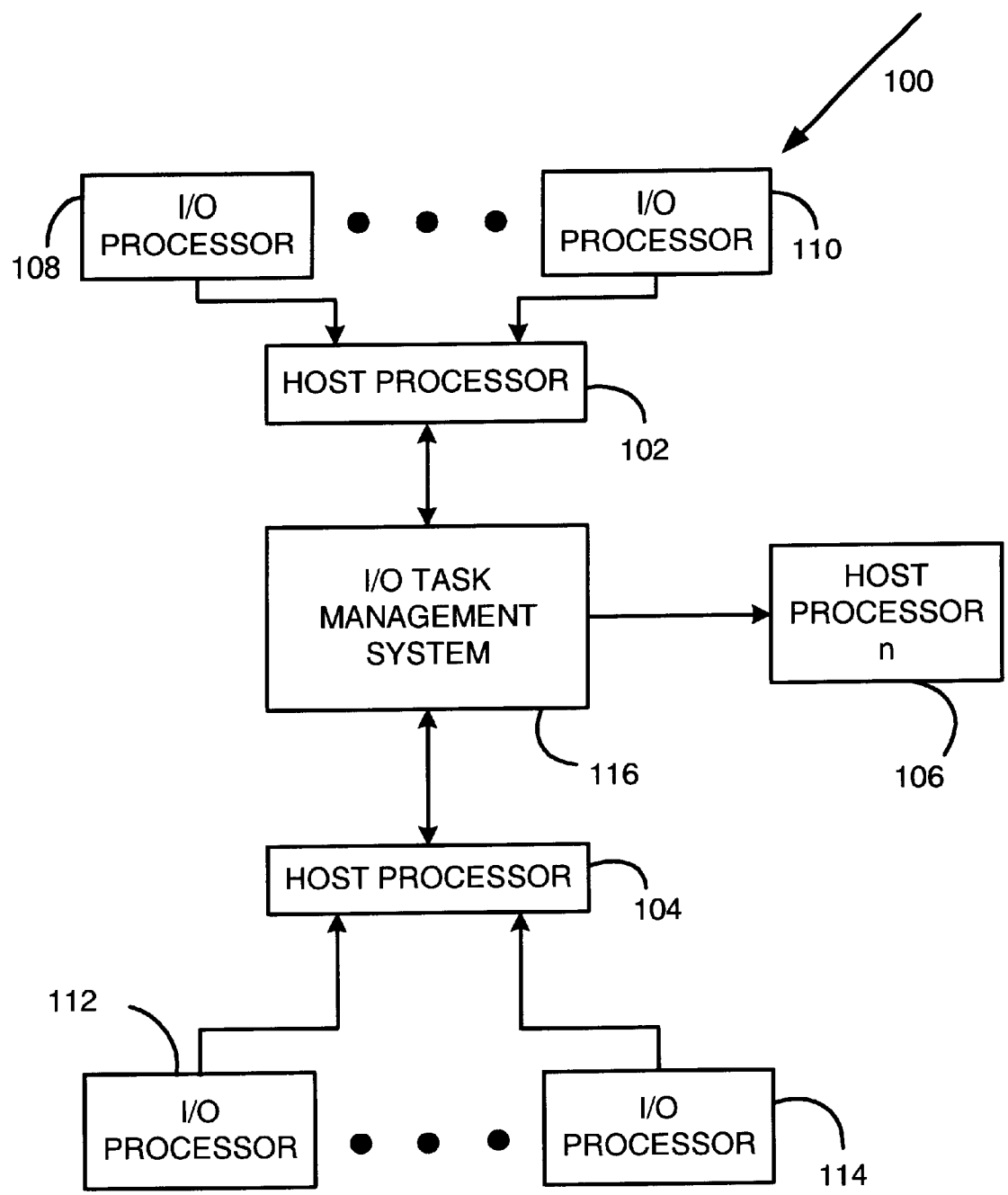
FIG. 1 is a block diagram of one embodiment of a multiprocessing computing system providing I/O task management in accordance with the present invention.

FIG. 1 is a block diagram of one embodiment of a multiprocessing computing system 100 providing I/O task management in accordance with the present invention. Multiprocessing generally refers to the operation of more than one processing unit within a single system. Multiple host processors may operate in parallel to enhance speed and efficiency. Separate processors may also take over communications or peripheral control, for example, while the main processor continues program execution. A host processor generally refers to the primary or controlling computer in a multiple computer network. In the multiprocessing computing system 100 of FIG. 1, each of a plurality of multiple host processors 102, 104 through host processor n 106 are coupled together to create a robust multiprocessing system. Each of the host processors typically includes memory, and may actually be comprised of multiple instruction processors (IPs) to create an aggregate host processing function.

In order to more efficiently control input and output functions, each of the host processors is interfaced to input/output (I/O) processors, which perform functions necessary to control I/O operations. The I/O processors relieve host processors from having to execute most I/O-related tasks, thereby allowing host processing functions to be expedited. In FIG. 1, any number of I/O processors may be coupled to a particular host processor. For example, host processor 102 is coupled to n processors, illustrated by I/O processors 108 to 110. Similarly, host processor 104 is shown coupled to a plurality of I/O processors 112, 114, and host processor n 106 is depicted as a stand-alone processor having no interfaced I/O processors.

Multiprocessing systems are used for various computing functions, including large database applications. A database generally refers to the large, shared, mass-memory data collections, and the technology to support efficient retrieval and reliable update of persistent data. Database management systems operable within the multiprocessing system comprises a collection of programs which interface with application programs and manage data on the application programs' behalf. The database management system provides data independence and integrity, and allows the database to maintain consistent data and data integrity.

It is also very important that the system provide transaction "indivisibility", wherein each transaction's requested database updates must be made permanent as a unit only if the transaction completes successfully. Where the transaction completes successfully, it is referred to herein as "committing" the data, meaning the transaction will become permanent. The systems which manipulate the databases are not infallible, and in the event that a failure occurs, the message processing system must guarantee that transaction messages are not lost, and that the messages are not processed twice. In these cases, the transaction is nullified, which ensures the overall database contents are always consistent, and that the transaction's messages reflect the results of such database content.

The present invention provides a high degree of certainty that transactions in a multiprocessing system are performed once, and only once. This transaction "indivisibility" is accomplished via the I/O task management system 116, which interfaces to each of the host processors 102, 104, 106 in the multiprocessing computing system 10D. In one embodiment of the invention, the I/O task management system 116 provides "producer descriptors", which simplifies processing after a host failure in the multiprocessing system occurs.

Figure 2:
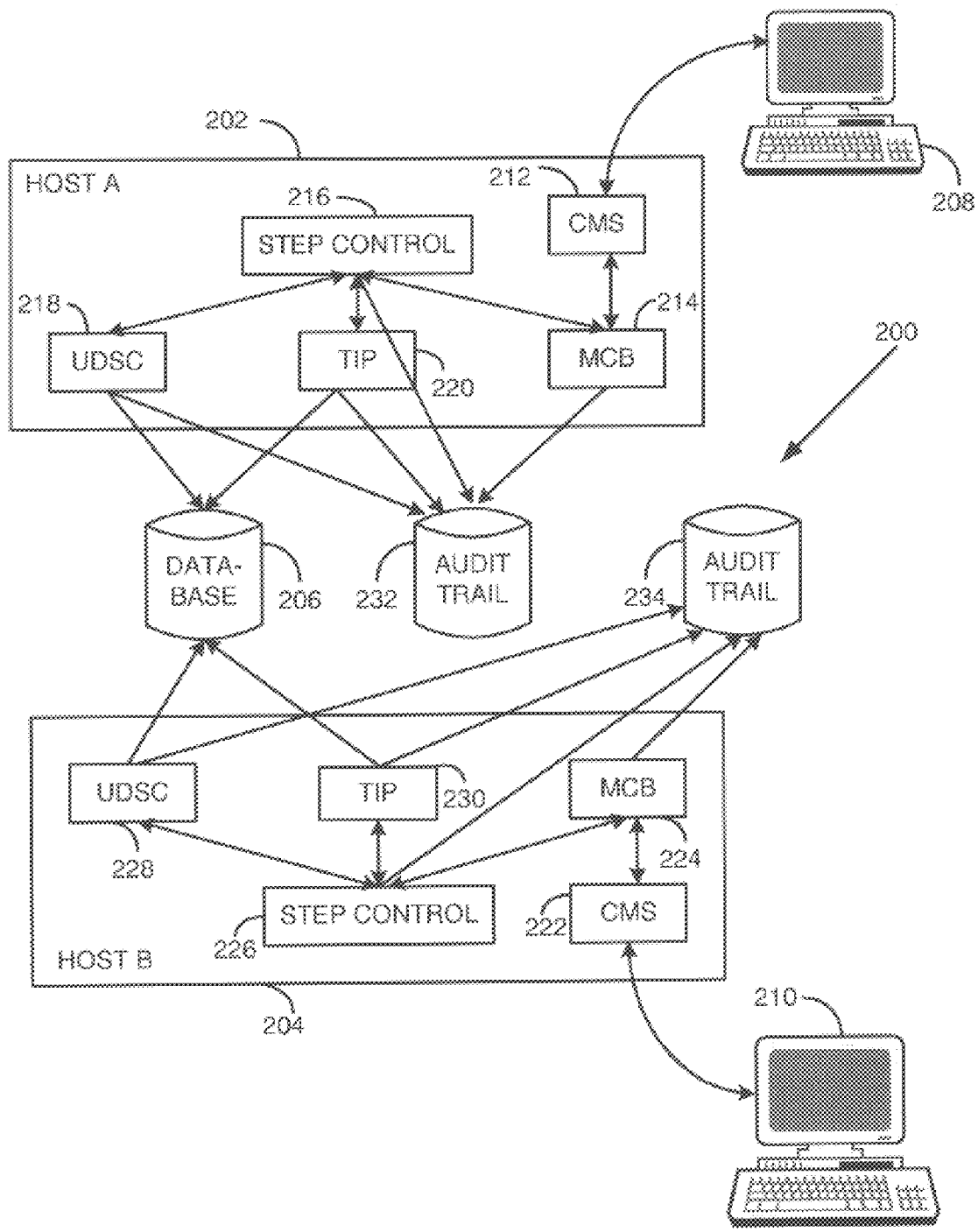
FIG. 2 is a block diagram illustrating a prior art multiprocessing system.

FIG. 2 is a block diagram illustrating a prior art multiprocessing system. The multi-processing system of FIG. 2 includes host A 202 and host B 204. Each host 202, 204 is coupled to a common database 206. Each host 202, 204 is also coupled to a user terminal, depicted by computing devices 208, 210, respectively.

When a user initiates a database transaction on a user terminal, such as computing device 208, the transaction request is sent in the form of a message from the terminal to the Communications Management System (CMS) communication program 212. The CMS program 212 provides handshaking protocols between the host and the terminal. The CMS module 212 forwards the message to the Message Control Bank (MCB) 214, which is a software module that manages all transaction-related messages received by the host from the terminal (source messages), or sent by a transaction to a terminal (destination messages). In turn, the MCB 214 notifies the step control module 216 that a message was received. The step control 216 is a software module that coordinates the activities of all components participating in a database transaction, including the MCB 214, the Universal Data System Control (UDSC) management system 218, and the Transaction Interface Processing (TIP) management system 220.

The UDSC 218 and the TIP 220 are database management systems which provide services to ensure the integrity of the database. For example, the UDSC 218 and the TIP 220 ensure that either all updates associated with the transaction are applied to the database, or none of the updates are applied to the database, in the event that a failure occurs during a transaction. Single database management systems could be used rather than the bifurcated database management system comprising the UDSC 218 and the TIP 220, but in the system of FIG. 2, the UDSC 218 is a relational database management system which provides a large searching capability, and the TIP 220 database management system is a "flat" or "linear" management system that provides fewer search capabilities, but faster database accesses in many circumstances. Therefore, depending on the nature of the user requests, one or possibly both of the database management systems will participate in a database transaction.

The host B 204 also includes software modules including the CMS 222, the MCB 224, step control 226, a UDSC 228, and the TIP 230. These software modules work analogously to the software modules in other hosts of the multiprocessing system, such as host A 202.

During transaction processing, the UDSC 218 and/or TIP 220 database management systems generally retain a copy of the existing data whenever the transaction requests a database update. If the transaction proceeds to a stable point where it can be "committed," all new updated data is secured to the database by the UDSC 218 and/or TIP 220 database management systems. If the transaction does not proceed to a stable point because a failure occurs before this committed state can be achieved, none of the updates are applied, but rather are "rolled back" so that the previous copy of the data is maintained. In order to revert to the previous copy of data in the event of a disk failure, each database update is saved to a file referred to as an "audit trail." An audit trail file is used for each host in a multi-processing system to save the updated states of the database at a location remote from each of the hosts, such as the host A audit trail 232 used in connection with host A 202, and the host B audit trail 234 used in connection with host B 204. Therefore, the audit trail information can be applied to the previous version of the database to recreate the latest copy of the database if that copy of the database were to be lost due to a disk failure.

In a multi-processing system including multiple host processors, one host can continue processing requests where another host has failed, without waiting for the failing host to recover. This can be accomplished as long as the database is put in a consistent state by the non-failing host. The non-failing host reads the failed host's audit trail data to determine which transactions have not yet been committed to the database, and to also locate those transactions which have only been partially committed and for which an "end-of-commit" record has not yet been written to the audit file. The updates associated with these uncommitted and partially committed transactions are then rolled back from the database by the non-failing host. After this rollback is completed, the non-failing host can continue processing requests against the database.

Figure 3:
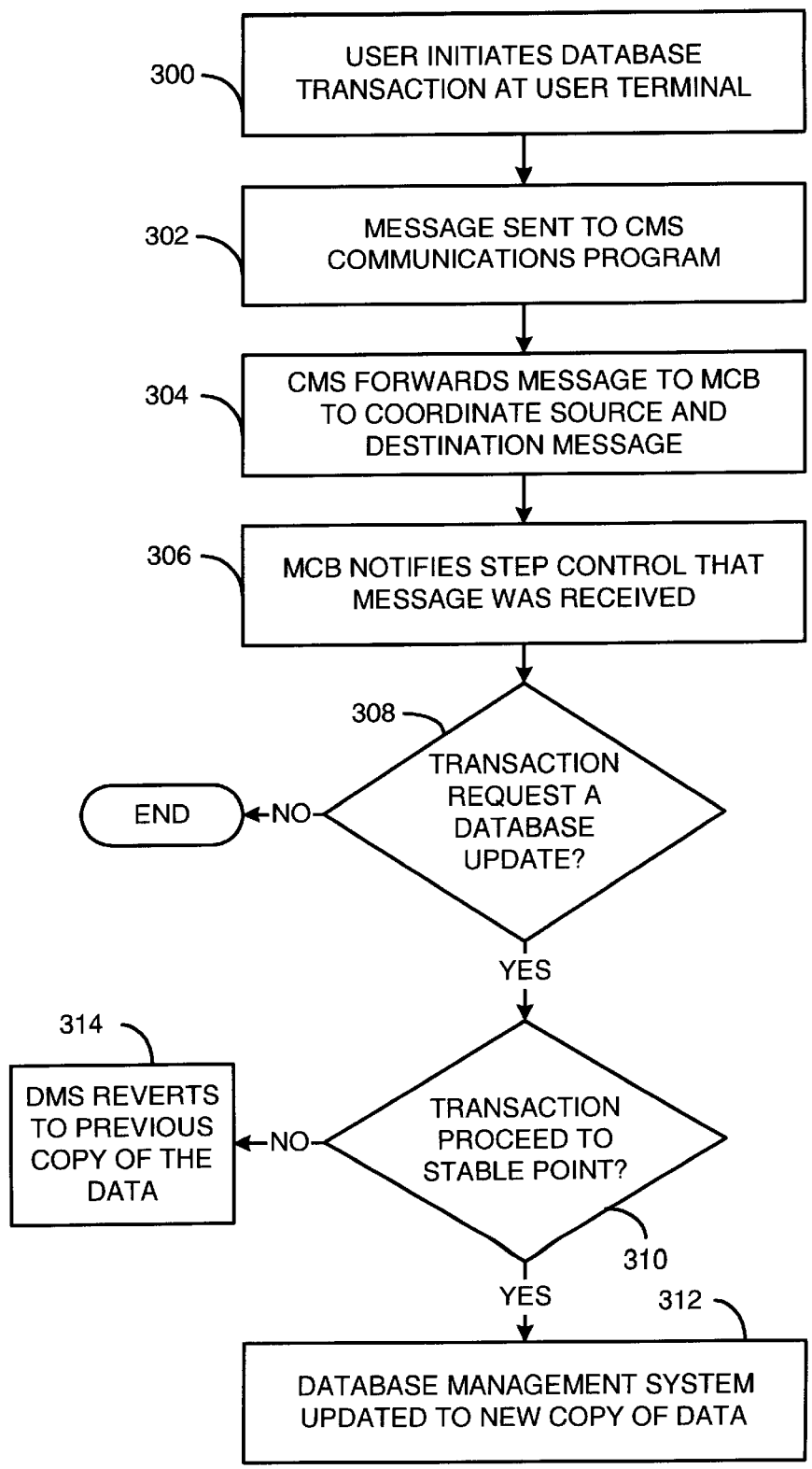
FIG. 3 is a flow diagram illustrating a prior art method for providing transaction indivisibility.

FIG. 3 is a flow diagram illustrating a prior art method for providing transaction indivisibility. According to this approach, a user initiates 300 database transactions from the user terminal. The message is sent to the CMS 212 communications program as shown in step 302, and the CMS forwards the message to the MCB 214 to coordinate the source and destination message, as shown in step 304. The MCB 214 notifies step control 216 that the message was received at step 306. Where it is determined 308 that a database update was requested by the transaction, and where it is determined 310 that the transaction has proceeded to a stable point, the database management system is updated 312 by a temporary memory buffer to include the new copy of data. Where the transaction did not proceed to a stable point at decision step 310, the database management system reverts 314 to the previous copy of the data which has been stored in a temporary buffer.

Figure 4:
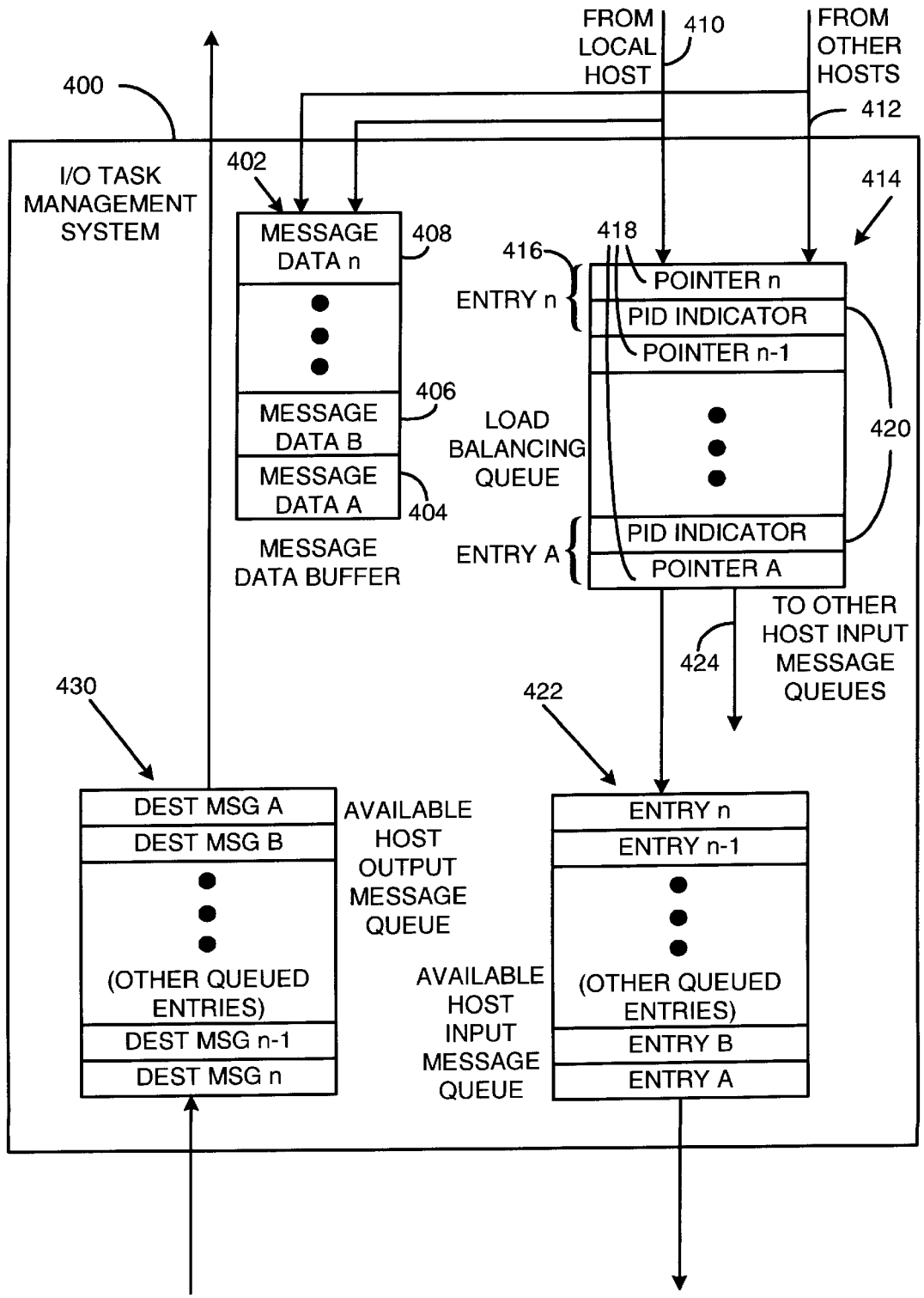
FIG. 4 illustrates one embodiment of an I/O task management system in accordance with the present invention.

Referring now to FIG. 4, one embodiment of an I/O task management system 400 for use in a system such as the multiprocessing computer system 100 of FIG. 1 is provided. When a host receives an input I/O request, it is typically received in the form of a message from a user terminal. This message, referred hereinafter as a "source message", contains message data, and a Process Identification (PID) indicator. In a transaction application environment, there may be several instances of the communications software, wherein each instance services a subset of the network terminal workstations which have sessions with the application. A session is a logical connection between any two addressable units in the system, and the PID indicator identifies the terminal session that provided the source message.

An instance of the communications software which is operating on the receiving host performs handshaking operations for the source message, and will pass the message data to the I/O task management system 400 where it is loaded into the message data buffer 402. The message data buffer 402 can hold multiple message data packets as seen by message data A 404, message data B 406 through message data n 408. Entries can be made into the message data buffer 402 from either local hosts and remote hosts, as indicated by lines 410 and 412 respectively.

An entry is loaded into a common load balancing queue 414 for every message data packet stored in the message data buffer 402. Each entry 416 includes a pointer 418 to the message data buffer 402, and also includes the PID indicator 420. The pointer is an address of the data packet as it is stored in the message data buffer 402, and the PID indicator identifies the terminal which provided the source message. As seen by lines 410 and 412, the common load balancing queue 414 receives entries 416 for source messages received from all hosts in the system, whether local or remote hosts.

The entries 416 in the load balancing queue 414 can be processed by any available host processor in the multiprocessing computer system. Each of the host processors has a corresponding input message queue and output message queue in the I/O task management system 400. When a particular host is available, the next entry in the load balancing queue 414 is queued into the available host's corresponding host input message queue 422 to await processing by the available host. Each host has a dedicated input message queue coupled to the load balancing queue 414, as illustrated by line 424, and each host processes the I/O requests in its own input message queue. The PID indicator 420 is provided to the host as part of the entry 416 to allow a host transaction program to send a destination output message back to the originating user terminal which indicates to the originating user terminal that the I/O request has completed successfully. PID indicators are described in greater detail in connection with FIGS. 6 and 7.

When message processing of an I/O request has been completed by an available host, the transaction program on the host creates a destination message which is added to its host output message queue 430 for the same instance of the communications program that handled the original source message. The communications program instance then sends the destination message to the terminal session indicated by the PID indicator associated with the destination message.

In the event of a failure of a host in a system such as the multiprocessing computing system 100, the system must ensure that messages are not lost, and that messages are not processed twice; i.e., the messages are processed once, and only once. This "indivisibility" principal is necessary to maintain the integrity of the database. For example, assume host 102 of FIG. 1 is in the process of adding a message to the Load Balancing Queue 414 in the I/O task management system 400 of FIG. 4. If host 102 fails during the processing of this message, it must guarantee that the message is added to the Load Balancing Queue 414 once and only once upon the recovery of host 102. The present invention provides for such indivisibility using the I/O task management system 400 of FIG. 4, and "producer descriptors", which are described more fully below.

Figure 5:
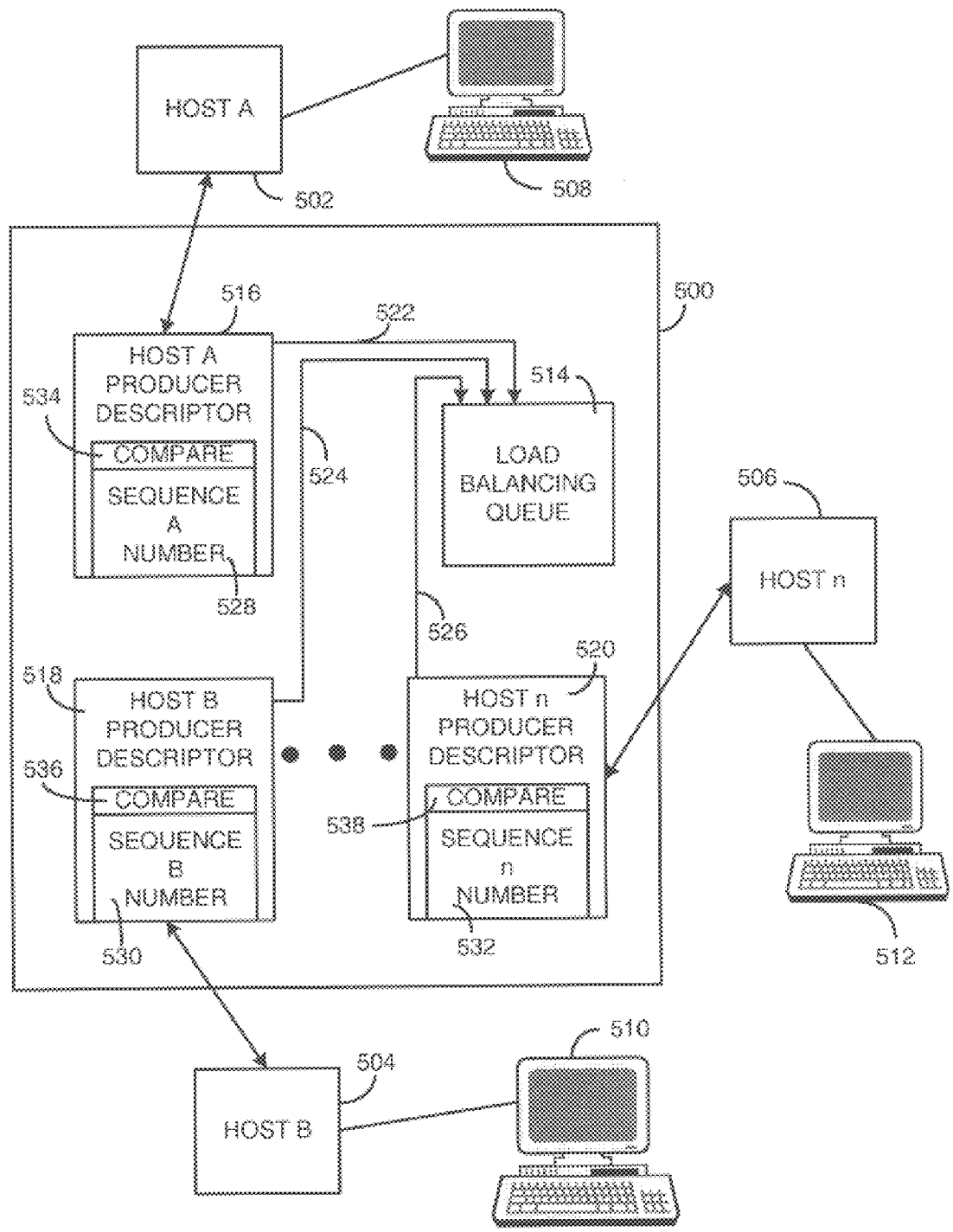
FIG. 5 is a block diagram illustrating the use of producer descriptors in the I/O task management system.

Referring now to FIG. 5, a block diagram illustrating the use of producer descriptors in an I/O task management system 500 is provided. The I/O task management system 500 is coupled to a plurality of host processing units, labeled host A 502, host B 504 through host n 506. Each of the host processors 502, 504, through 506 are coupled to one or more user terminals, represented by computing devices 508, 510 and 512 respectively.

A producer descriptor, in one embodiment of the invention, is a combination of hardware and firmware that manages message entry into the common load balancing queue 514, (which corresponds to the load balancing queue 414 of FIG. 4). One producer descriptor is resident in the I/O task management system 500 for each host in the computing system that receives source messages. Producer descriptors 516, 518 through 520 are associated with host A 502, host B 504, and host n 506 respectively. Each of the host producer descriptors 516, 518 through 520 are coupled to the load balancing queue 514 via connections 522, 524 and 526 respectively.

An application program operating under the control of a host processor, such as host A 502, will pass a source I/O message to its corresponding producer descriptor, such as host A producer descriptor 516. A message "sequence number" for host A 502 is also passed to the host A producer descriptor 516. The sequence number identifies which of a plurality of source messages has been sent from the particular host processor. In one embodiment of the invention, the sequence number is integrally associated with the source message, and is therefore transferred to the producer descriptor concurrently with the source message.

When the producer descriptor receives the source message and corresponding sequence number, it stores the sequence number. This is depicted by the sequence A number block 528 at the host A producer descriptor 516, the sequence B number block 530 at the host B producer descriptor 518, and the sequence n number block 532 at the host n producer descriptor 520. The particular producer descriptor adds an entry to the load balancing queue 514 if the sequence number received from the host indicates that the received source message is the next sequential message that has been sent by that host. In one embodiment of the invention, this is accomplished by comparing the sequence number associated with the source message with the existing stored sequence number stored at the producer descriptor. If the sequence number associated with the source message is exactly one greater than the current sequence number stored at the producer descriptor for that host, then that producer descriptor will add the source message entry to the load balancing queue 514.

For example, if the sequence A number 528 is equal to 50, then the host A producer descriptor 516 will only transfer a source message received from host A 502 to the load balancing queue 514 if the sequence number associated with the new source message is equal to 51. The producer descriptor accomplishes this function using a compare module. The host A producer descriptor 516 includes compare module 534, the host B producer descriptor 518 includes compare module 536, and the host n producer descriptor 520 includes compare module 538. Each of these compare modules compares the incoming sequence number with the sequence number stored within the respective producer descriptor.

The producer descriptors accomplish the entry of a source message on the load balancing queue 514 by utilizing a command that performs an indivisible operation which performs two concurrent functions. The source message entry is added to the load balancing queue 514, and at the same time increments the sequence number stored at the respective producer descriptor. This indivisible operation guarantees that an entry is never added to the load balancing queue 514 without the incrementation of the sequence number, and analogously, that the sequence number is never incremented without the entry being added to the load balancing queue 514.

The use of the producer descriptors simplifies processing after a host or communications failure, and provides for indivisibility in a multiprocessing system. If a host or communication fails while transferring a message to its associated producer descriptor in the I/O task management system 500, the host will not be required to determine if the message entry was successfully added to the load balancing queue 514. The host simply re-transfers the message to the producer descriptor with the sequence number upon its recovery. If the message was already successfully added to the load balancing queue 514 by the producer descriptor prior to the host failure, the sequence number provided with the source message will not be correct, because the sequence number issued by the recovered host will have already been incremented during the prior successfully-completed operation. Therefore, the compare module of the producer descriptor will determine that the issued sequence number is not exactly one greater than the sequence number stored at the producer descriptor. In this case, the source message from the host is simply discarded by the producer descriptor. Otherwise, the producer descriptor creates the entry for the source message on the load balancing queue 514.

Figure 6:
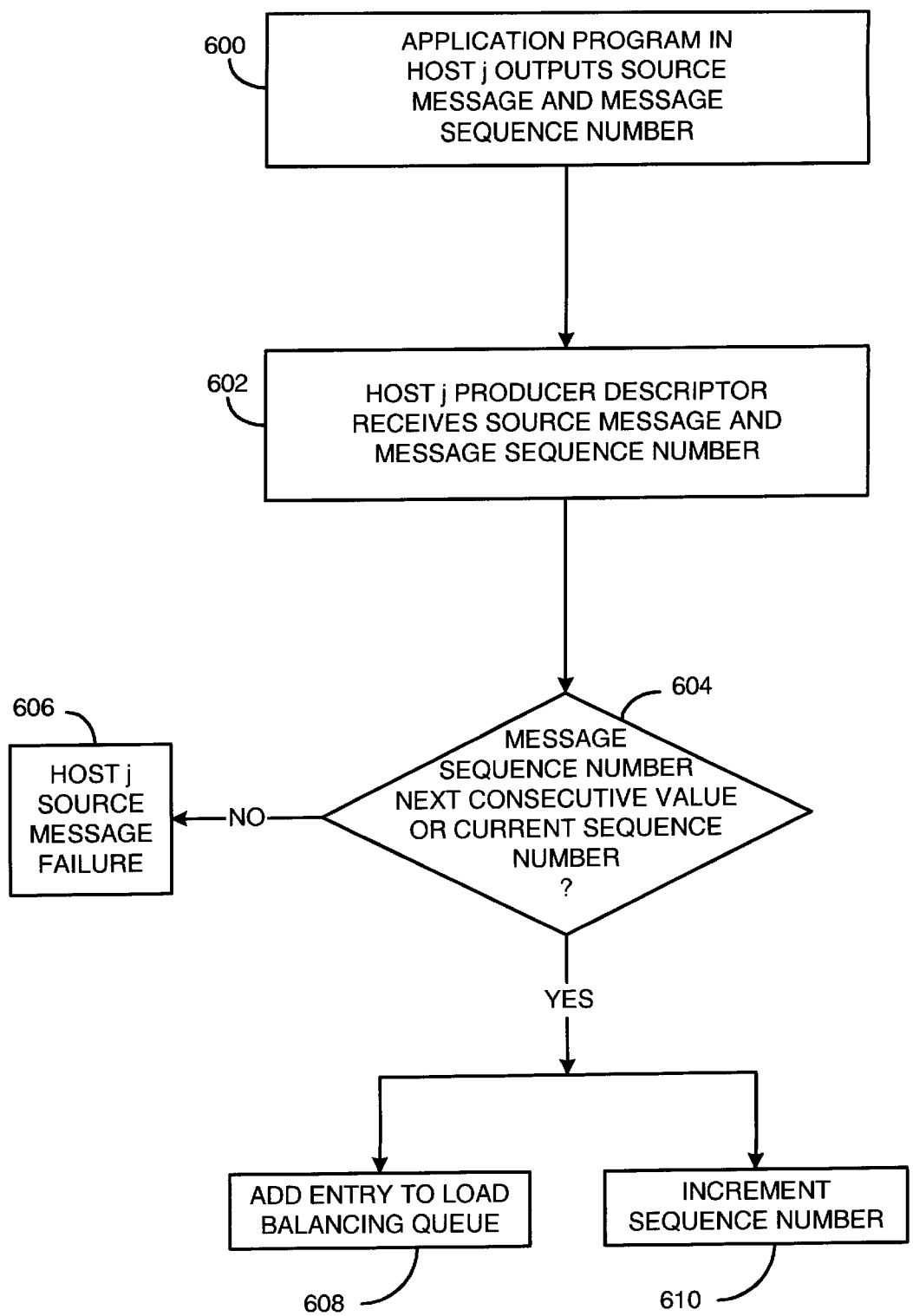
FIG. 6 is a flow diagram illustrating a method of ensuring transaction indivisibility for a multiprocessing system in accordance with one embodiment of the invention.

FIG. 6 is a flow diagram illustrating a method of ensuring transaction indivisibility for a multiprocessing system in accordance with one embodiment of the invention. An application program operating in any of the hosts (e.g., host j) in a multiprocessing system outputs a source input/output message and a message sequence number as illustrated at block 600. The message sequence number identifies the source message as distinguished from other messages previously sent or which will subsequently be sent. This message sequence number can be represented in any predetermined numeric, alphanumeric, or alpha character pattern. In the embodiment represented by FIG. 6, a numeric, sequential pattern is used, so that each source message sent is associated with an integer step of an incrementing number pattern (e.g., 1, 2, 3, etc.).

At block 602, the host j producer descriptor receives the source message, and the associated sequence number, from its corresponding host j. Where the message sequence number is not equal to the next consecutive number (e.g., current value plus one) currently stored at the host j producer descriptor as determined at block 604, the host j source message has failed 606. However, where the message sequence number is equal to one greater than the current sequence number at the producer descriptor, two events concurrently occur.

To determine whether the message sequence number is not equal to the next consecutive number currently stored at the host j producer descriptor, the stored sequence number can be subtracted from the message sequence number, and where the difference is one, the received source message is different than, and immediately successive to, the preceding source message. Similarly, the stored sequence number can be added to one, and the resulting value can be compared with the sequence number of the received source message. If the two numbers are equal, the received source message is sequential with respect to the preceding source message associated with the stored sequence number.

The entry is added to the load balancing queue as shown at block 608, and the sequence number stored at the host j producer descriptor is incremented as shown at block 610. Performing these operations concurrently provides for transaction indivisibility by loading the current source message on the load balancing queue at the same time that the sequence number at the producer descriptor is updated. Furthermore, incrementing the sequence numbers prepares the producer descriptor for the next incoming source message.

Figure 7:
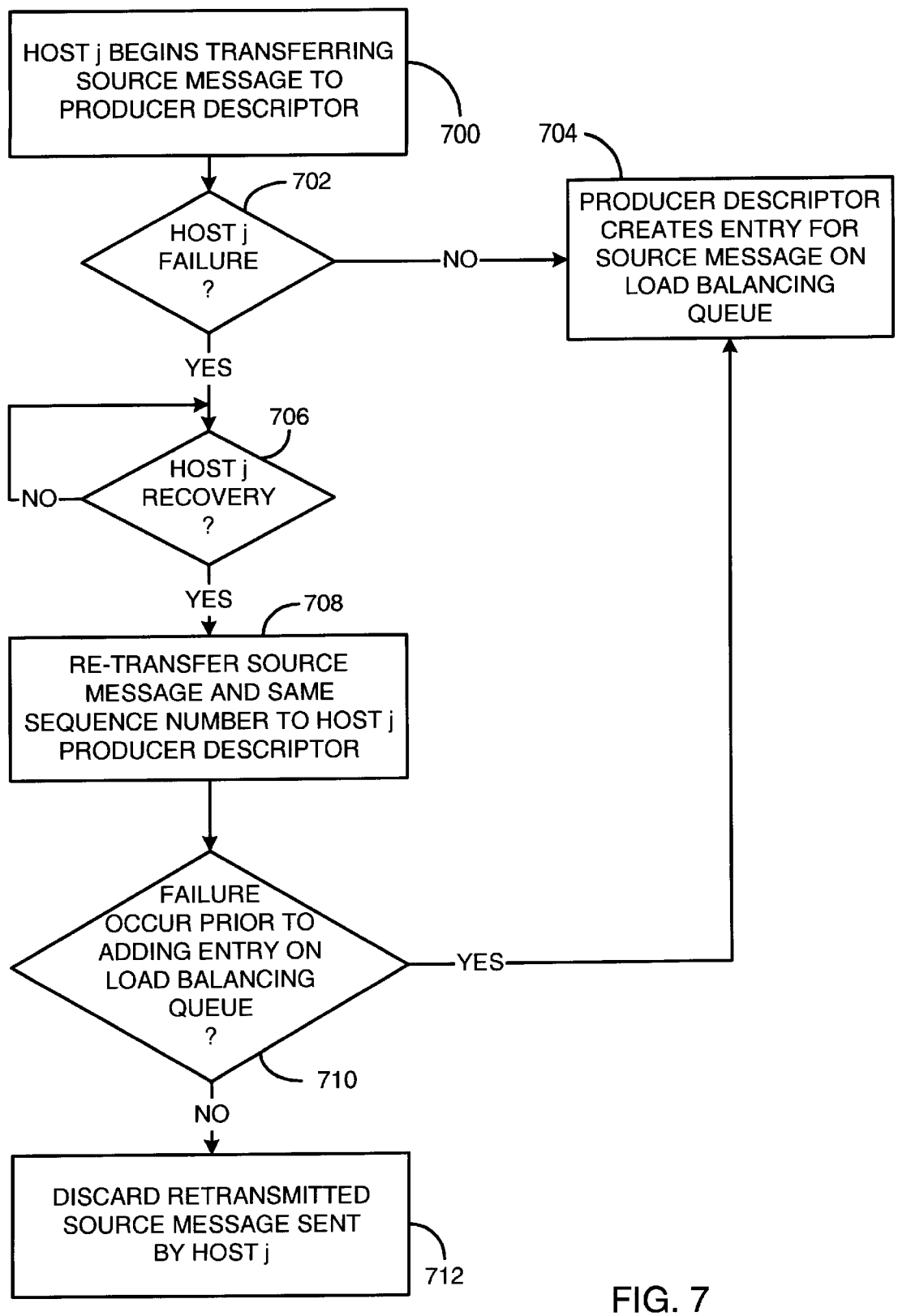
FIG. 7 is a flow diagram illustrating one manner in which transaction indivisibility is maintained by a host which has recovered from its failure.

FIG. 7 is a flow diagram illustrating one manner in which transaction indivisibility is maintained by a host which has recovered from its failure. At block 700, host j begins transferring a source message to its corresponding producer descriptor. Transmission of a source message may be interrupted by a host failure. If no host j failure at block 702 occurs while transmitting the source message, the producer descriptor creates an entry for the source message on the load balancing queue, as indicated at block 704.

If it is determined 702 that a host j source failure occurred, the host attempts to recover from the failure, either through self-recovery procedures or through manual intervention. While the host j attempts to recover, processing at host j is suspended as illustrated by the continual loop at block 706 where host j has not yet recovered.

When host j successfully recovers, it re-transmits 708 the source message that was pending at the time of the host failure. The same source message and sequence number are therefore sent to the host j producer descriptor. Where it is determined 710 that the failure occurred prior to adding the entry on the load balancing queue, the re-transmission of the source message will prove to be necessary, as the originally transmitted source message was unsuccessful in reaching the load balancing queue, and the sequence number at the host j producer descriptor was not incremented by the original source message transmission. This determination 710 is accomplished by a comparison of the sequence number included with the re-transmitted source message and the sequence number stored at the host j producer descriptor. Because the producer descriptor's sequence number had not been incremented, the sequence number provided with the re-transmitted source message will still be exactly one greater than the sequence number stored at the host j producer descriptor, and the entry will be created on the load balancing queue.

Where it is determined 710 that the failure occurred after the entry was successfully loaded on the load balancing queue, the re-transmission of the source message will prove to be unnecessary, and the sequence number at the host j producer descriptor will have already been incremented. In this case, the sequence number stored at the host j producer descriptor will not be exactly one greater than the sequence number provided by the re-transmitted source message (i.e., in this example the difference will be zero). Therefore, the re-transmitted source message is not necessary, and can simply be discarded 712. A subsequently-transmitted source message sequence number would then be exactly one greater than the sequence number at the host j producer descriptor, and source message transmission would continue normally.

The use of the producer descriptors provides a convenient and accurate method of maintaining indivisibility. In this way, the host is not required to determine if the message entry was successfully added to the load balancing queue through an interrogation of the load balancing queue.

Figure 8:
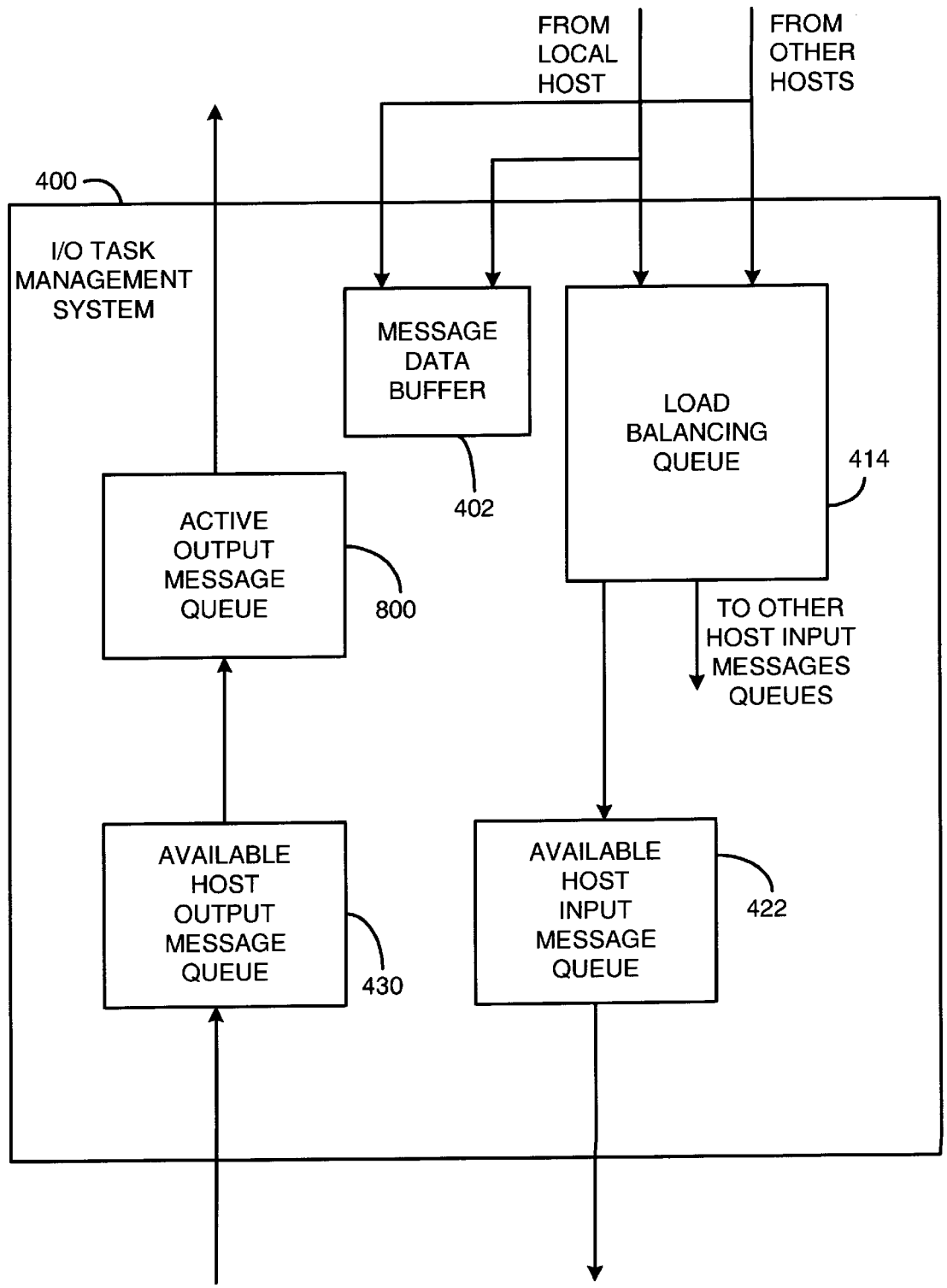
FIG. 8 is a block diagram illustrating one embodiment of an I/O task management system which provides completion status message indivisibility.

FIG. 8 is a block diagram illustrating one embodiment of an I/O task management system which provides completion status message indivisibility. It is desirable to have a system which guards against sending duplicate completion status messages resulting from a communications failure during completion status message transmission.

FIG. 8 illustrates an embodiment of the I/O task management system 400 that was depicted in FIG. 4, which includes the message data buffer 402, load balancing queue 414, the available host input message queue 422, and the available host output message queue 430. In this embodiment of the invention, an active output message queue 800 is also provided. To ensure that duplicate completion status messages are not issued, the present invention provides two queues for output messages for each communications program instance, including the available host output message queue 430 and the active output message queue 800. When a transaction generates a message, it is first routed to the output message queue 430 for a particular communications program instance according to the mapping contained in the PID descriptor. When the communications program instance is available to transmit the output message back to the initiating terminal, an entry associated with the message is moved from the output message queue 430 to the active output message queue 800 until transmission is completed. If the communications program instance fails, all entries in the active output message queue 800 are considered "possible duplicates", and are handled accordingly based on the transaction associated with that message. In the case of a simple user terminal, the destination message is flagged as a possible duplicate, and the user can then verify whether the message is indeed a duplicate. In the case where the I/O device is more sophisticated, such as a personal computer, a protocol may be utilized between the communications (e.g., CMS) and the user terminal to automatically detect duplicate destination messages.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for providing database transaction indivisibility in a transaction processing system following recovery from a host processor failure, wherein the host processor transmitted at least one source message prior to the host processor failure, the method comprising:

transmitting a unique sequence number with each of the source messages transmitted prior to the host processor failure, wherein each of the unique sequence numbers are incrementally sequential in accordance with a source message transmission sequence;

receiving the source messages via a receiving buffer;

executing an indivisible transaction operation comprising:

(a) concurrently entering a newly-transmitted source message on a message execution queue and replacing a stored sequence number associated with an immediately-preceding source message with the unique sequence number of the newly-transmitted source message, if the source message is successfully received at the receiving buffer; and (b) prohibiting entering the newly-transmitted source message on the message execution queue and replacing the stored sequence number, if the source message is not successfully received at the receiving buffer;

retransmitting the newly-transmitted source message and its corresponding unique sequence number upon recovery from the host processor failure;

entering the retransmitted source message on the message execution queue when the unique sequence number of the retransmitted source message is incrementally sequential with respect to the stored sequence number; and disregarding the retransmitted source message when the unique sequence number of the retransmitted source message is equivalent to the stored sequence number, thereby indicating that the retransmitted source message was successfully entered on the message execution queue prior to the host processor failure.

2. The method as in claim 1, further comprising comparing the unique sequence number of the retransmitted source message with the stored sequence number to determine whether the retransmitted source message is incrementally sequential with respect to the stored sequence number.

3. The method as in claim 2, wherein comparing comprises subtracting the stored sequence number from the unique sequence number of the retransmitted source message, and comparing a resulting value to a positive value of one.

4. The method as in claim 2, wherein comparing comprises adding one to the stored sequence number, and comparing a resulting value to the unique sequence number of the retransmitted source message.

5. The method as in claim 1, further comprising providing a message acknowledgment signal to the host processor upon successful execution of the source message on the message execution queue.

6. The method as in claim 1, wherein disregarding the retransmitted source message comprises denying entry of the retransmitted source message on the message execution queue.

7. The method as in claim 1, wherein replacing the stored sequence number comprises overwriting the stored sequence number with the unique sequence number in a non-volatile memory location independent of the host processor failure.

8. The method as in claim 1, further comprising providing the message execution queue in a non-volatile memory independent of the host processor failure.

9. The method as in claim 1, wherein entering the retransmitted source message on the message execution queue comprises storing a pointer to the retransmitted source message in the message execution queue.

10. A task management system for ensuring database transaction indivisibility in a transaction processing system having a plurality of host processing units and a database, comprising:

a message queue having a plurality of storage segments to queue source messages destined for the database sent by each of the host processing units;

a plurality of producer descriptors, one for each of the plurality of host processing units in the transaction processing system, each coupled to its respective one of the host processing units to receive unique sequence numbers corresponding to each of the source messages sent by its respective one of the host processing units, wherein each of the producer descriptors comprises:

a sequence number storage register to store a current sequence number uniquely identifying a most recently received source message;

a receiving register to receive a subsequent source message and a subsequent sequence number uniquely identifying the subsequent source message;

a message sequence comparator coupled to the sequence number storage register and the receiving register to compare the current and subsequent sequence numbers, and to concurrently enable transferring the second source message to the message queue and replacing the current sequence number in the sequence number storage register with the subsequent sequence number, if the current and subsequent sequence numbers indicate that the subsequent source message immediately succeeds the most recently received source message; and wherein, upon recovery of a host processor failure, the host processing unit experiencing the failure retransmits the subsequent source message and the subsequent sequence number that was being transmitted at the time of the host processor failure.

11. The task management system as in claim 10, wherein the message sequence comparator comprises:

an adder to add one to the current sequence number to generate an addition result indicative of a next consecutive sequence number to the current sequence number; and a comparator to compare the addition result to the subsequent sequence number, and to enable the transfer of the subsequent source message to the message queue when the addition result and the subsequent sequence number are equal.

12. The task management system as in claim 10, wherein the message sequence comparator comprises:

a subtractor to subtract the current sequence number from the subsequent sequence number to generate a difference result; and a comparator to compare the difference result to a value of one, and to enable the transfer of the subsequent source message to the message queue when the difference result is equal to one.

13. The task management system as in claim 10, further comprising one or more source message terminals coupled to each of the plurality of host processing units to provide source messages to initiate desired database transactions.

14. The task management system as in claim 13, further comprising a plurality of host input message queues, each coupled to a respective one of the host processing units and to the message queue, to allow an available one of the host processing units to receive a successive one of the source messages in the message queue for processing by the available host processing unit.

15. The task management system as in claim 14, further comprising a plurality of host output message queues, each coupled to a respective one of the host processing units to receive destination messages generated at the respective one of the host processing units which processed the source message.

16. The task management system as in claim 15, further comprising a common output message queue coupled to each of the plurality of host output message queues, to collectively queue the destination messages generated at the host processing units for transmission to initiating ones of the source message terminals.

17. A method for providing transaction indivisibility in a transaction processing system having a database and at least one host processing unit for transmitting source messages, comprising:

transmitting an identifying sequence number and message data with each of the source messages;

for each source message transmitted, indivisibly entering the message data on a message execution queue and replacing a previously-stored sequence number with the identifying sequence number, whereby the previously-stored sequence number is not replaced unless the message data is entered on the message execution queue;

upon recovery of a host processing unit failure, retransmitting the source message being transmitted at the time of the host processing unit failure;

indicating an indivisibility failure if the identifying sequence number of the retransmitted source message is not consecutive with respect to the previously-stored sequence number, wherein the indivisibility failure indicates that the retransmitted source message was successfully entered on the message execution queue prior to the host processing unit failure; and entering the retransmitted source message on the message execution queue if the identifying sequence number is consecutive with respect to the previously-stored sequence number.

18. The method as in claim 17, further comprising comparing the identifying sequence number of the retransmitted source message to the previously-stored sequence number to determine whether the identifying sequence number of the retransmitted source message is consecutive with respect to the previously-stored sequence number.

19. The method as in claim 18, wherein comparing the identifying sequence number of the retransmitted source message to the previously-stored sequence number comprises determining whether a difference between the identifying sequence number and the previously-stored sequence number is equal to a predetermined number which indicates whether the source message is different than, and immediately successive to, the preceding source message.

20. The method as in claim 19, wherein the predetermined number is set to one.

21. The method as in claim 18, wherein determining whether a difference between the identifying sequence number and the previously-stored sequence number is equal to a predetermined number comprises subtracting the previously-stored sequence number from the identifying sequence number, and comparing a resulting value to a value of one to determine whether the identifying sequence number is sequential with respect to the previously-stored sequence number.

22. The method as in claim 18, wherein determining whether a difference between the identifying sequence number and the previously-stored sequence number is equal to a predetermined number comprises adding a value of one to the previously-stored sequence number, and determining whether a resulting value is equal to the identifying sequence number to determine whether the identifying sequence number is sequential with respect to the previously-stored sequence number.

23. The method as in claim 18, wherein determining whether the identifying sequence number of the retransmitted source message is consecutive with respect to the previously-stored sequence number comprises determining whether the identifying sequence number of the retransmitted source message is consecutive with respect to the previously-stored sequence number according to a predefined sequence of characters.

24. The method as in claim 23, wherein the predefined sequence of characters is a predefined sequence of numbers.

25. The method as in claim 23, wherein the predefined sequence of characters is a predefined sequence of alphanumeric characters.

26. The method as in claim 23, wherein the predefined sequence of characters is a predefined alpha character pattern.

27. The method as in claim 17, wherein indicating an indivisibility failure further comprises discarding the retransmitted source message where the identifying sequence number is not consecutive with respect to the previously-stored sequence number.

28. The method as in claim 17, wherein indivisibly entering the message data and replacing the previously-stored sequence number with the identifying sequence number comprises prohibiting the entering the source message on the message execution queue unless the previously-stored sequence number is replaced with the identifying sequence number, and prohibiting replacing the previously-stored sequence number with the identifying sequence number unless the source message is entered on the message execution queue.

29. The method as in claim 17, wherein indivisibly entering the message data and replacing the previously-stored sequence number with the identifying sequence number comprises concurrently replacing the previously-stored sequence number with the identifying sequence number and entering the source message on the message execution queue.

* * * * *